(12) United States Patent
Agurok et al.

(10) Patent No.: US 6,369,925 B1
(45) Date of Patent: Apr. 9, 2002

(54) BEAM COMBINER

(75) Inventors: Il'ya Agurok, Long Beach; Lonnie Lindsey, Westminster, both of CA (US)

(73) Assignee: Physical Optics Corporation, Torrance, CA (US)

(*) Notice: Subject to any disclaimer, the term of this patent is extended or adjusted under 35 U.S.C. 154(b) by 0 days.

(21) Appl. No.: 09/591,335

(22) Filed: Jun. 9, 2000

(51) Int. Cl.[7] .................................. H04B 10/00
(52) U.S. Cl. ................ 359/172; 359/124; 359/618; 359/641
(58) Field of Search ................ 359/124, 127, 359/131, 172, 618, 641

(56) References Cited

U.S. PATENT DOCUMENTS 5,113,244 A * 5/1992 Curran .................. 359/131
6,193,393 B1 * 2/2001 Dove et al. ............. 362/251

FOREIGN PATENT DOCUMENTS

SU        1282051 A1    1/1987

OTHER PUBLICATIONS

English Translation of Abstract of Russian SU 1282051 A1.
Spigulis, Janis, Compact dielectric reflective elements. I. Half–sphere concentrators of radially emitted light, Sep. 1994, Applied Optics, vol. 33, No. 25, pp. 5970–5974.

* cited by examiner

*Primary Examiner*—Kinfe-Michael Negash
(74) *Attorney, Agent, or Firm*—Nilles & Nilles, S.C.

(57) ABSTRACT

A nonimaging beam combiner and collimator. The nonimaging beam combiner and collimator can include at least two light sources that emit light of the same wavelength through a focus point and a nonimaging element that receives the light of the same wavelength after the focus point and collimates the light at the same wavelength through the atmosphere. The at least two light sources can include fiber light sources, optical fibers, gradient index lenses, fiber lasers or laser diodes. The collimator can include an input surface, a paraboloid surface located adjacent to the input surface, a conical surface located adjacent to the paraboloid surface, and an ellipsoid surface located adjacent to the conical surface and located on an opposite side of the collimator from the input surface. The paraboloid surface can include a total internal reflection surface.

29 Claims, 11 Drawing Sheets n = 1.6
(OPTICAL GLASS, POLYSTYRENE)

n = 1.7
(OPTICAL GLASS)

n = 1.8
(OPTICAL GLASS)

n = 2.31
(ZINC SULFIDE)

BEAM COMBINER

BACKGROUND OF THE INVENTION

1. Field of Invention

The present invention is directed to a beamforming device. More particularly, the present invention is directed to a method and apparatus for combining and collimating light through the atmosphere.

2. Description of Related Art

Presently, lighting systems can be used to transmit light. This transmitted light can be used to communicate data between a source and a receiver. For example, data may be transmitted from a source across fiber optics to a receiver. Additionally, the transmitted light can be used to pinpoint objects. For example, a laser sight can be used to pinpoint a target. Furthermore, transmitted light can be used for engraving purposes. For example, high power radar can utilize transmitting light for target illumination.

Unfortunately, many present lighting systems do not provide adequate power for numerous applications. Furthermore, it can be cost and space prohibitive to increase the power of the light for use in numerous applications. For example, it is cost prohibitive to transmit high-speed data across the atmosphere because of the necessary power requirements. Also, cost and size constraints can prohibit the use of a large lighting system for many applications, such as systems for pinpointing targets. For example, presently the highest power laser diodes cannot produce more than one to four Watts of power. This power can be insufficient for making a three-dimensional rendering of a battle scene when dense atmospheric conditions are present.

SUMMARY OF THE INVENTION

The present invention provides a nonimaging beam combiner and collimator (NIBCC). The NIBCC can include at least two first light sources that emit light of the same wavelength through a focus point and a nonimaging element that receives the light of the same wavelength after the focus point and collimates the light of the same wavelength through the atmosphere. The at least two first light sources can include at least one of fiber light sources, optical fibers, gradient index lenses, fiber lasers and laser diodes. The collimator can include an input surface, a paraboloid surface located adjacent to the input surface, a conical surface located adjacent to the paraboloid surface, and an ellipsoid surface located adjacent to the conical surface and located on an opposite side of the collimator from the input surface. The paraboloid surface uses total internal reflection principals.

The NIBCC can further include at least two second light sources, the at least two second light sources emitting light of a same second wavelength through the focus point. The nonimaging element can further receive the light of the same second wavelength after the focus point and collimate the light of the same second wavelength to sum the power of the light of the same second wavelength through the atmosphere.

The NIBCC can additionally include a light source controller coupled to at least one of the at least two first light sources and an atmospheric condition sensing device coupled to the light source controller. The light source controller can control light emitted by at least one of the at least two first light sources based on atmospheric conditions sensed by the atmospheric condition sensing device. The light source controller can also cause the at least one of the at least two first light sources to stop emitting light when the atmospheric condition sensing device senses that the atmosphere transmits light easily. The light source controller can further cause the at least one of the at least two first light sources to emit light when the atmospheric condition sensing device senses that the atmosphere does not transmit light easily. The atmospheric condition sensing device can include a laser radar. The light source controller can perform at least one of boosting, maintaining and lowering the power of light through the atmosphere based on atmospherics sensed by the atmospheric sensing device. The atmospheric condition sensing device can sense atmospheric conditions within a beam of the light of the same first wavelength through the atmosphere.

The NIBCC can be utilized in an engraver. The NIBCC can also be utilized in a target pointing system for targeting an object.

The NIBCC can additionally be utilized in an atmospheric optical network. The atmospheric optical network can include an atmospheric optical data node. The atmospheric optical data node can include at least two first light sources, the at least two first light sources emitting light of a same first wavelength through a focus point. The atmospheric optical data node can also include at least two second light sources, the at least two second light sources emitting light of a same second wavelength through the focus point. The atmospheric optical data node can further include a nonimaging element that receives the light of the same first wavelength after the focus point and collimates the light of the same first wavelength to sum a power of the light of the same first wavelength through the atmosphere and receive the light of the same second wavelength after the focus point and collimate the light of the same second wavelength to sum the power of the light of the same second wavelength through the atmosphere. The atmospheric optical network can also include a second atmospheric optical data node.

The atmospheric optical network can additionally include a receiver that receives the light of the same first wavelength and the light of the same second wavelength from the atmosphere. The receiver can be located approximately at least two kilometers, 10 kilometers, or more from the apparatus for combining and collimating light. The receiver can include a wavelength division demultiplexer that demultiplexes the light of the same first wavelength from the light of the same second wavelength. The receiver can also include an add/drop multiplexer.

The atmospheric optical network can further include a reflector that reflects the collimated light through the atmosphere. The atmospheric optical network can also include a refractor that refracts the collimated light to a first receiver and a second receiver.

The atmospheric optical network can additionally include a light source controller coupled to at least one of the at least two first light sources and an atmospheric condition sensing device coupled to the light source controller. The light source controller can control light emitted by the at least one of the at least two first light sources based on atmospheric conditions sensed by the atmospheric condition sensing device. The light source controller can also cause the at least one of the at least two first light sources to stop emitting light when the atmospheric condition sensing device senses that the atmosphere transmits light easily. The light source controller can additionally cause the at least one of the at least two first light sources to emit light when the atmospheric condition sensing device senses that the atmosphere does not transmit light easily.

The atmospheric condition sensing device can include a laser radar. The light source controller can boost, maintain or lower the power of light through the atmosphere based on atmospherics sensed by the atmospheric sensing device. The atmospheric condition sensing device can sense atmospheric conditions within a beam of the light of the same first wavelength through the atmosphere.

The NIBCC offers the following advantages: It achieves a high quality collimated beam with 0.5 mrad divergence. Also, it is mechanically rugged and does not require periodic alignment during the operation, even under battlefield conditions. Additionally, it is inexpensively mass produced by either molding or diamond-turning technologies. Furthermore, it is transparent to enemy radar in battlefield application because it can be made without metal elements; therefore, it supports stealth technology. Also, it is very compact; 10 times smaller than a conventional optics approach. The size of the NIBCC can be <2"×2"×3". Additionally, it is stable against contamination with an outer surface that can be easily cleaned. Furthermore, it provides phase coherent collimation at microwave modulation frequencies of 1 GHz because the optical path difference in the NIBCC can be designed to be much less than the coherence length of a 1 GHz microwave signal. Also, it provides high efficiency (>98% transmission, with antireflection coating on the NIBCC) light collimation. Additionally, potential aberrations of individual beams can be small because the more beams the NIBCC combines, the smaller every partial aperture of the entrance beam. Furthermore, the NIBCC can combine beams of the same wavelength.

The NIBCC can be very inexpensive and can maintain its stability in the presence of temperature deviations and vibrations. Because of its ability to achieve high brightness in small, solid angles, it will be attractive in many commercial applications such as airport landing lights, unidirectional warning approach lights for high masts, police searchlights, and helicopter approach lights.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
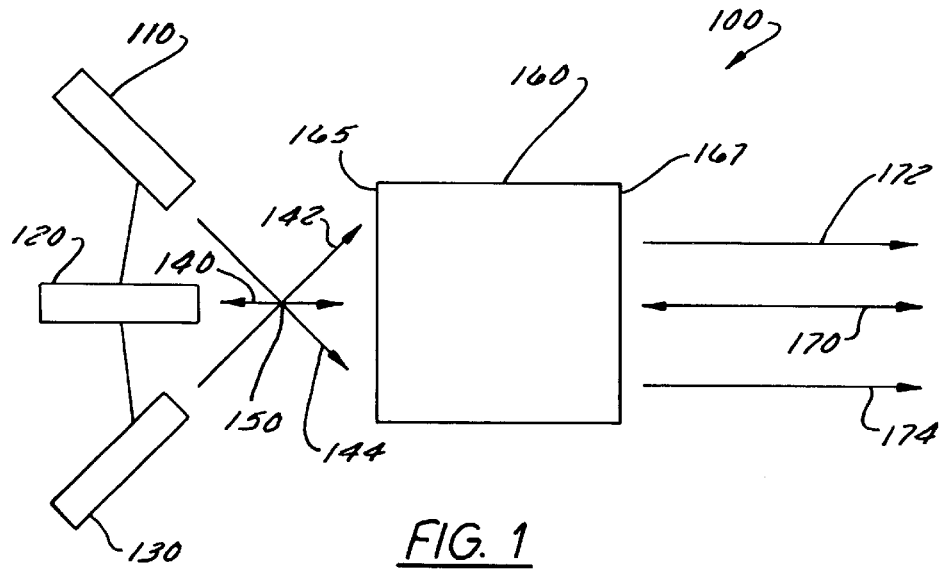
FIG. 1 is an exemplary block diagram of a system for combining and collimating light through the atmosphere according to a first embodiment.

FIG. 1 is an exemplary block diagram of a system or apparatus 100, such as a NIBCC, for combining and collimating light through the atmosphere according to a first embodiment. The apparatus 100 can include light sources 110, 120, and 130, and a non-imaging element (NE) 160. The light sources 110, 120, and 130 can include at least two light sources 110 and 130 or can include more than two light sources 110 and 130. The light sources 110, 120, and 130 may further include fiber light sources, optical fibers, gradient index lenses, fiber lasers, laser diodes or any other device useful as a light source. The NIE 160 can include an input surface 165 and an output surface 167. The NIE 160 may comprise an apparatus for collimating and/or combining light. In operation, the light sources 110, 120, and 130 can emit light 140, 142, and 144 directed towards the input surface 165 of the NIE 160. At least two of the light sources can emit light of substantially the same wavelength. The light 140, 142, and 144 can be substantially directed through a focus point 150 towards the input surface 165 of the NIE 160. The NIE 160 and can collimate and combine the light 140, 142, and 144. The NIE 160 can then output collimated and combined light 170, 172, and 174 through output surface 167. By collimating and combining the light received through the focus point 150, the NIE 160 can sum the intensities of the received light 140, 142, and 144 to create the combined light 170, 172, and 174 through output surface 167. Thus, for example, the intensity of light emitted by one light source can double by adding a second light source, triple by adding a third light source, etc.

The light source 120 may contain a light controller and atmospheric sensor and may be coupled to at least one of the light sources 110 and 130. For example, the light source 120 may be a lidar or laser radar and may emit light 140 through the focus point 150 which may travel through the NIE 160 and be emitted as light 170 out of the output surface 167. A portion of the light 170 can be reflected back through the NIE 160 depending on atmospheric conditions. For example, dense fog or smog may cause more light to be reflected back than a clearer atmosphere. The light may be reflected back through the NIE 160 back to the light source 120. The atmospheric sensor of the light source 120 can then sense changes in atmospheric conditions. When atmospheric conditions change, the light controller of the light source 120 can control the light emitted by light sources 110 and 130. For example, when atmospheric conditions make it difficult to transmit light, the light controller can cause additional light sources, such as light source 110, to transmit light or to increase the intensity of the light transmitted. Therefore, one light source may be used for clear atmospheric conditions and more light sources may be added to compensate for denser atmospheric conditions.

Figure 2:
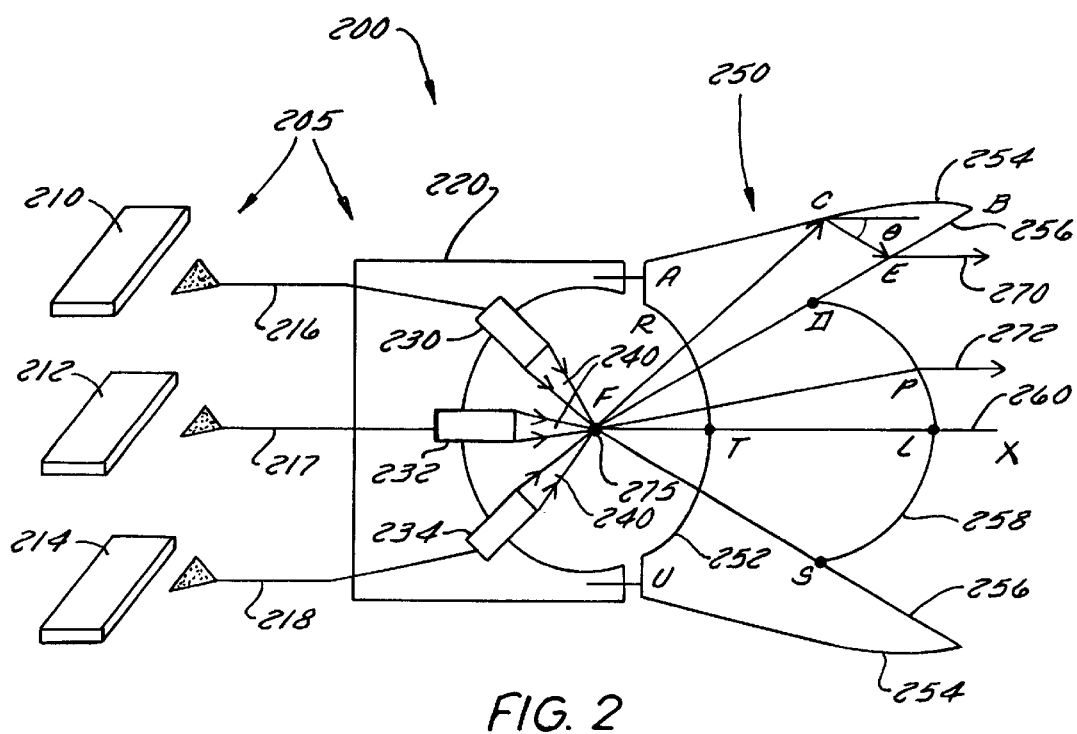
FIG. 2 is an exemplary diagram of a system or apparatus for combining and collimating light through the atmosphere according to another embodiment.

FIG. 2 is an exemplary diagram of a system or apparatus for combining and collimating light through the atmosphere such as a NIBCC 200 according to another embodiment. The NIBCC 200 can include light sources 205 and NIE (NIE) 250. The light sources 205 can include laser diodes 210, 212, and 214 and gradient index (GRIN) lenses 230, 232, and 234. The GRIN lenses 230, 232, and 234 can be mounted in an illuminator housing 220. The NIE 250 can include an input surface 252, a parabolic surface 254 a conical surface 256 and an ellipsoid surface 258. The conical surface 256 is conical about the x-axis 260. In operation, the laser diodes 210, 212, and 214 may project light through the GRIN lenses 230, 232, and 234 in the form of light 240 through a focal point 275. The light 240 can enter the NIE 250 through the input surface 252 and be reflected and refracted as output light 270 and 272 which is parallel to the x-axis 260.

More particularly, in operation, the light from the laser diodes 210, 212, and 214 is coupled to the fibers 216–218, using either horn technology or conventional optics. A number of GRIN lenses 230, 232, and 234 steer light to the focal point 275 of the NIE 250. The NIE can then output the light as output light 270 and 272.

The NIE 250 consists of surfaces with rotation symmetry about the x-axis 260. The input surface 252 is spherical, with its center at point 275. The rays from point 275 go through the input surface 252 without refraction. Surface 254 from A to B includes a parabola with its focus at point 275. Every ray FC will be reflected (as ray CE) in a direction parallel to the parabola's axis through total internal reflection. The conical surface 256 from B to D will refract ray CE in a direction parallel to the x-axis. The ellipsoid 258 from D to L to S has a back focus at point 275. This surface 256 will directly refract incident rays such as FP in a direction parallel to the x-axis as, for example, output light 272. The acquisition angle of the NIE 250 can be 180° (i.e., the NIE can collect light from a π solid angle). It is also an aberration-free collimating element for point sources. Because the focusing spot size at point 275 can be extremely small (~50 λm), the NIE 250 can provide 0.5 mrad divergence of the outgoing beam. To support low aberrations in the NIE 250, which can be made from optical plastic using diamond-turning technology, the acquisition angle can be reduced to 160°. This reduction in the acquisition angle does not significantly reduce the amount of collected light.

Figure 3:
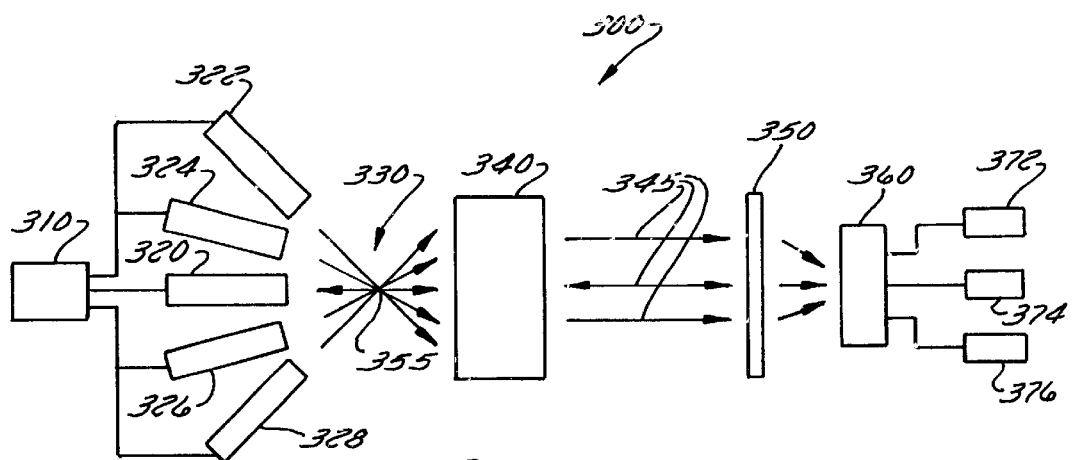
FIG. 3 is an exemplary block diagram of an atmospheric optical network system according to one embodiment.

FIG. 3 is an exemplary block diagram of an atmospheric optical network system 300 according to one embodiment. The system 300 can include a data source 310 light sources 320, 322, 324, 326, and 328, light 330 emitted through a focus point 335, a NIE 340, combined and collimated light 345, a receiver that can include a lens 350 and a detector 360 and terminals 372, 374, and 376. In operation, the data source 310 may provide data for light sources 320–328 to project as light 330. For example, data source 310 may provide binary data for light sources 320–328 to emit as pulsed light. To effectuate different channels, light sources 322 and 324 may emit light of a first wavelength for one channel. Additionally, light sources 326 and 328 may emit light of the second wavelength to effectuate a section channel. Therefore, data of a first channel may be transmitted by light sources 322 and 324 and data of a second channel may be transmitted by light sources 326 and 328.

Light source 320 may contain a light controller and atmospheric sensor for sensing atmospheric conditions in controlling the light sources 322, 324, 326, and 328. Therefore, for clear atmospheric conditions, less light sources may be used for conservation of power. For dense atmospheric conditions, additional light sources of the same wavelength may be used per channel to increase the power of a transmission through the atmosphere. The light controller and atmospheric sensor may be positioned external to the system 300. Therefore, it is not necessary for the light controller and atmospheric sensor to receive light through the NIE 340.

Light 330 is transmitted through focal point 335 to the NIE 340. The NIE 340 may then combine and collimate the light 345. The light 345 may be received and focussed by the lens 350 of the receiver to a detector 360 of the receiver. The detector 360 may then distribute different channels of data to different terminals 372, 374, and 376. For example, the detector 360 may comprise a detector array, a wavelength division demultiplexer, an optical to electric converter and/or an add/drop multiplexer/demultiplexer. The terminals 372, 374, and 376 may be additional detectors, computer terminals, servers, nodes, or anything else that can utilize data.

Figure 4:
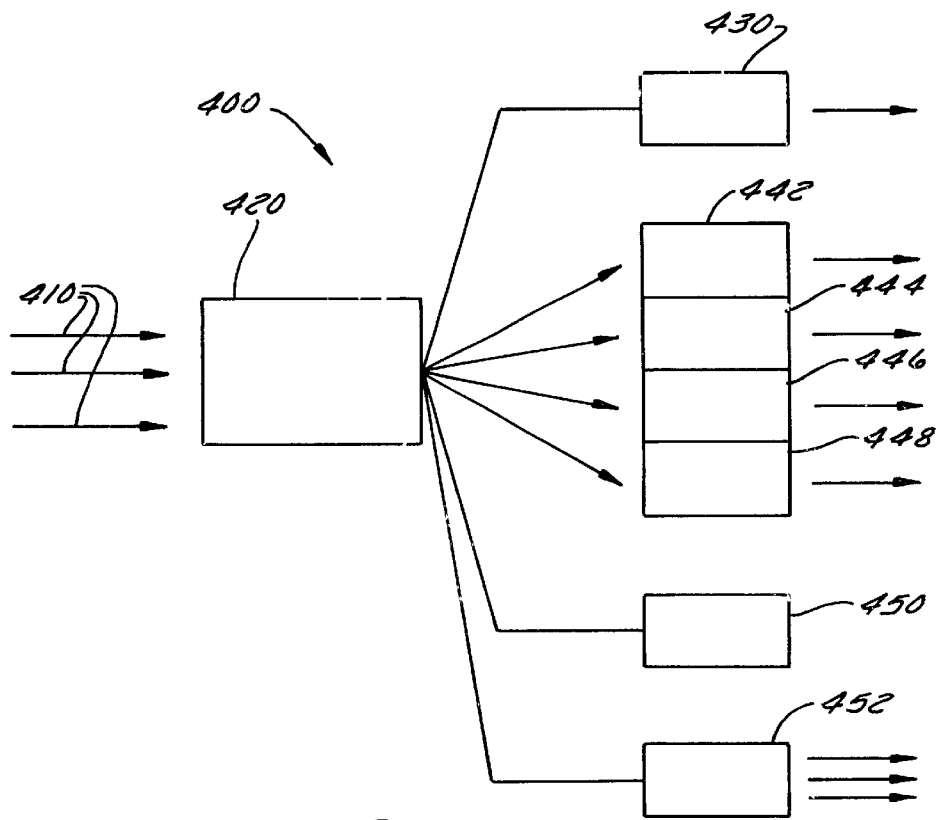
FIG. 4 is an exemplary block diagram of a receiver according to one embodiment.

FIG. 4 is an exemplary block diagram of a receiver 400 according to one embodiment. The receiver 400 may operate as the detector 360 of the system 300 illustrated in FIG. 3. The receiver 400 can include a detector 420, an optical pump 430, opto-electrical detectors 442, 444, 446, and 448, a tester 450 and an acousto-optic add/drop multiplexer/demultiplexer (AOADM) 452. In operation, the detector 420 can receive light 410 from the atmosphere. The detector 420 can include a lens or beam splitter, detector circuitry, optical sensors, wavelength division demultiplexers or the like. The detector may then distribute data received from the light 410 to the other elements of the receiver 400. The data may be distributed as optical or as electrical data. The optical pump 430 can receive the data as optical data or light and can then amplify the light for continued transmission. The opto-electrical detectors 442–448 can receive the data as light and can convert the light to electrical signals for use by electrical systems. Each detector 442–448 can receive separate channels demultiplexed from the light 410. The detectors 442–448 can then convert the optical data to electrical signals for transmission to subsequent devices.

The testing device 450 can test the atmospheric conditions based on various criteria and can control other devices appropriately. For example, the testing device 450 may use in-band lidar for testing of atmospheric conditions. The AOADM 452 can add or drop additional channels in the form of additional wavelengths of light carrying data and can continue transmission of the light by use of additional NIBCCs. The AOADM 452 may also regenerate received signals for continued transmission. The AOADM 452 may perform functions entirely in the optical domain or may perform conversion to the electrical domain and then back into the optical domain. The AOADM 452 can then send signals to other receivers.

Figure 5:
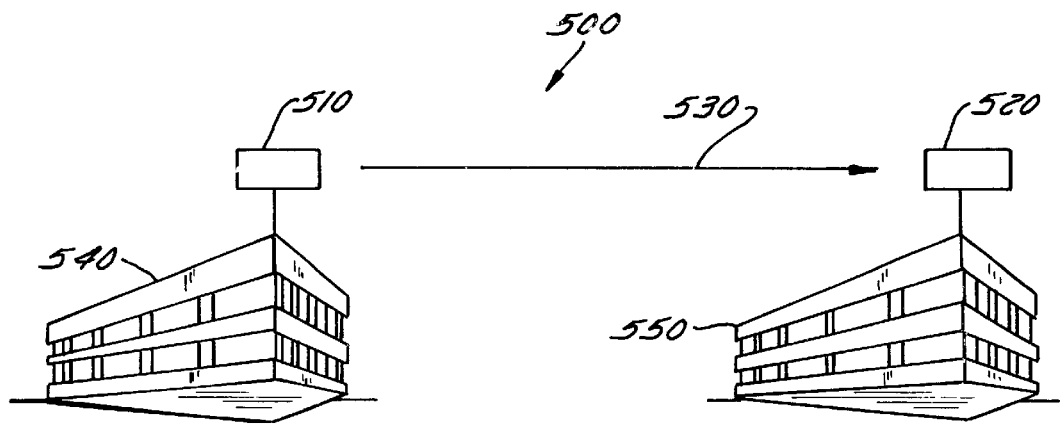
FIG. 5 is an exemplary illustration of a system utilizing NIBCCs according to one embodiment.

FIG. 5 is an exemplary illustration of a basic system 500 utilizing NIBCCs according to one embodiment. The basic system 500 can include a first atmospheric optical data node (AODN) 510, a second AODN 520, collimated and combined light 530, a first structure 540 and a second structure 550. The first AODN 510 may be mounted on the first structure 540. The second AODN 520 may be mounted on the second structure 550. The structures 540 and 550 may comprise buildings, towers or any other useful structure for housing an AODN. The structures 540 and 550 may be located, for example, approximately 10 km apart. An AODN can include an apparatus for combining and collimating light through the atmosphere such as the apparatus 100 illustrated in FIG. 1. In operation, the AODN 510 can transmit data in the form of combined and collimated light 540 to the second AODN 520. Thus, the basic system 500 may be utilized to effectuate a metropolitan area network (MAN) such as a campus area network or may be used to effectuate a wide area network (WAN).

Figure 6:
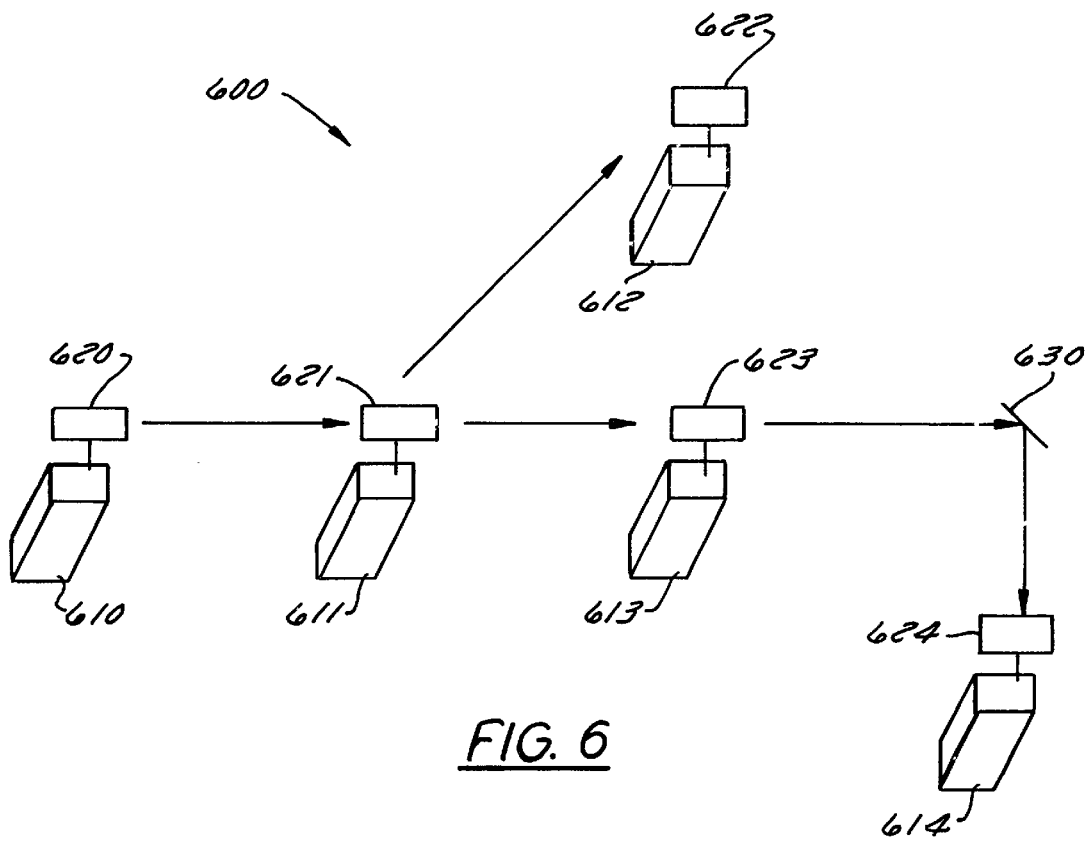
FIG. 6 is an exemplary illustration of a network that utilizes NIBCCs according to one embodiment.

FIG. 6 is an exemplary illustration of a network 600 that utilizes NIBCCs according to one embodiment. The network 600 can include structures 610–614, AODNs 620–624 and a reflector 630. In operation, the AODN 620 may transmit data using combined and collimated light to the AODN 621. The AODN 621 may receive data transmitted using the light and may regenerate, reflect or refract the light to AODNs 622 and 623. The AODN 623 may utilize data transmitted from the light and may further transmit the light to reflector 630. The reflector 630 may reflect the light to AODN 624. Therefore, the reflector 630 may be used to overcome an obstacle blocking a direct path from AODN 623 to AODN 624. The network 600 may be utilized to effectuate an WAN or MAN. All of the AODNs 620–624 may utilize receivers such as that illustrated in FIG. 4 and NIBCCs such as those illustrated in FIGS. 1 and 2.

Figure 7:
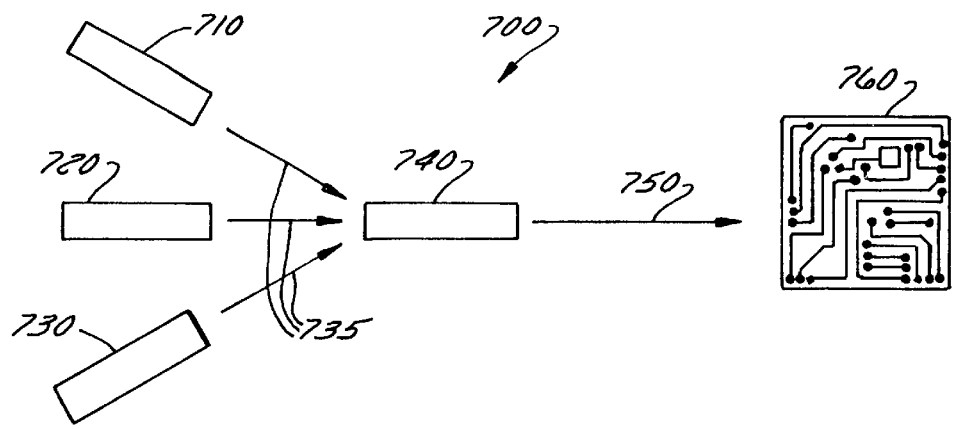
FIG. 7 is an exemplary block diagram of an engraver according to one embodiment.

FIG. 7 is an exemplary block diagram of an engraver 700 according to one embodiment. Engraver 700 may include light sources 710, 720, and 730 and a NIE 740. In operation, the light sources 710, 720, and 730 may project light 735 through a focal point to the NIE 740. The NIE 740 may then combine and collimate the light as light 750 towards an object 760. Thus, the NIE 740 can produce light with a high intensity which is equal to the sum of the intensities of the light 735 emitted by the light sources 710, 720, and 730. The engraver 700 can be used to engrave various objects, such as object 760, by using light.

Figure 8:
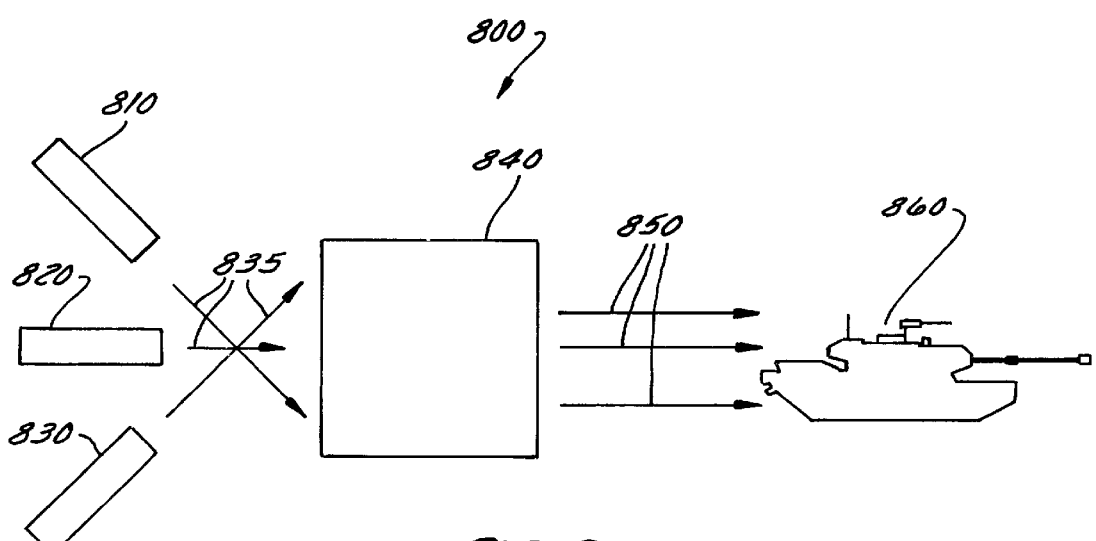
FIG. 8 is an exemplary illustration of a target pointing system according to one embodiment.

FIG. 8 is an exemplary illustration of a target pointing system 800 according to one embodiment. The target pointing system 800 may comprise light sources 810, 820, and 830 and a NIE 840. In operation, the light sources 810, 820, and 830 can emit light 835 through a focal point to the NIE 840. The NIE 840 can then combine and collimate the light and output it as light 850. The light 850 may be used to target an object 860. Thus, the power of light sources 810, 820, and 830 may be combined by the NIE 840 to produce high intensity light 850. The high intensity light 850 can then be used to target an object 860.

Figure 9:
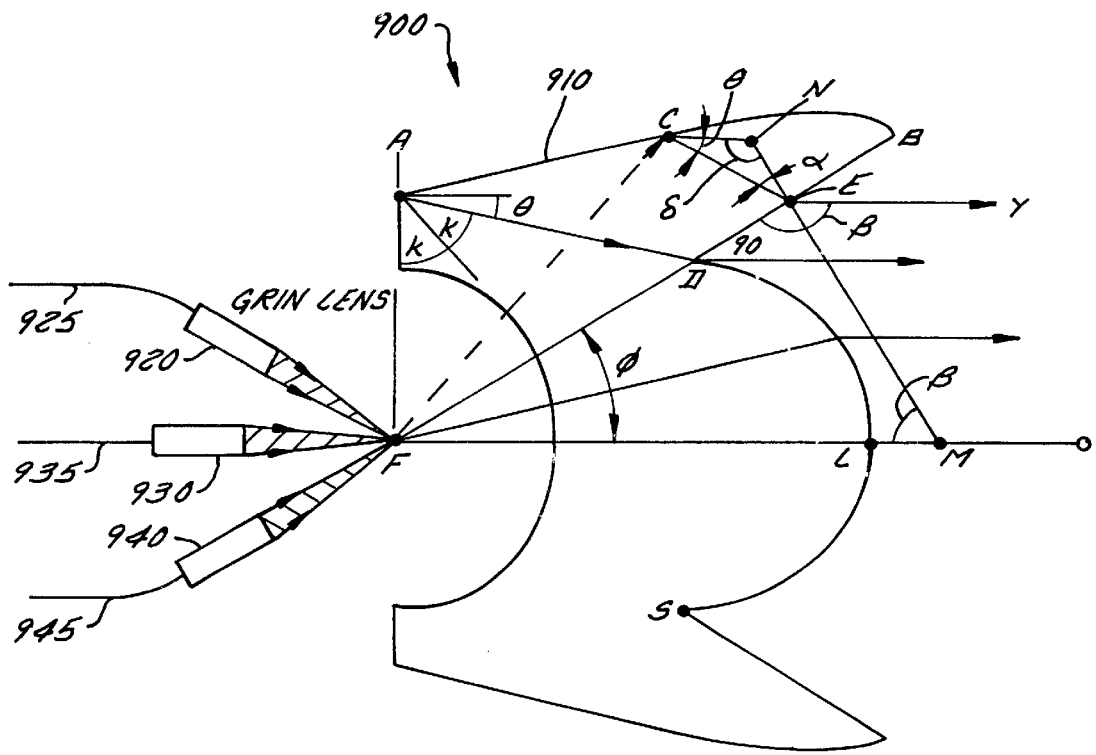
FIG. 9 is an exemplary illustration of the design of a NIBCC according to one embodiment.

FIG. 9 is an exemplary illustration of the design of a NIBCC 900, such as the NIBCC illustrated in FIG. 2, according to one embodiment. The NIBCC 900 can include a NIE 910 and GRIN lenses 920, 930, and 940 attached to an array of fibers 925, 935, and 945. NIE 910 can concentrate light from a whole hemisphere. The maximum accepted ray is FA. The lateral surface AB is a paraboloid of rotation, which reflects light at the angle of total internal reflection k or at angles greater than this angle.

$$h \sin k = 1, \quad (1\text{-}2)$$

where h is the reflective coefficient of the nonimaging element material. All rays will be reflected at an angle $\theta$ from the optical axis FO. After refraction at the conical surface BD, the outgoing rays will be parallel to the axis FO. Where n is the refractive coefficient, $$n \sin \alpha = \sin \beta \quad (1\text{-}3)$$

If the outgoing ray $\gamma$ is parallel to the axis FO, from triangle FEM:

$$\beta = 90° - \phi \quad (1\text{-}4)$$

where EM is normal to the conical surface DB. From Triangle CNE:

$$\alpha = 180° - \theta - \delta \quad (1\text{-}5)$$

Therefore, $$\delta = 180° - \beta \quad (1\text{-}6)$$

or, taking into consideration Eq. (1-4), $$\delta = 180° - 90° + \phi = 90° = \phi \quad (1\text{-}7)$$

so $$\alpha = 180° - \phi - 90° = 90° - \theta - \phi \quad (1\text{-}8)$$

so the main equation that determines the design of the nonimaging element is the interpretation of Eq. (1-3):

$$n \sin(90° - \theta - \phi) = \sin(90° - \phi),$$

or $$n \cos(\theta + \phi) = \cos(\phi). \quad (1\text{-}9)$$

Because $\theta = 90° - 2K$, and angle K is known from Eq. (1-2), Eq. (1-9) gives the magnitude of $\phi$.

Figure 10:
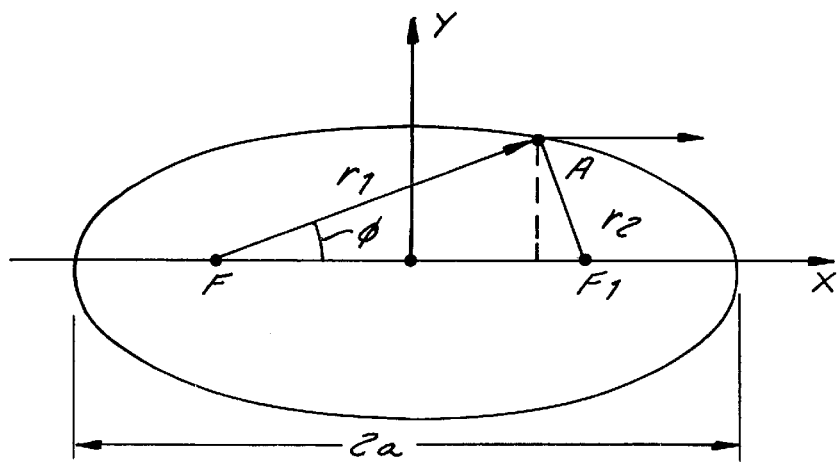
FIG. 10 is an exemplary illustration of how rays exit parallel to an x-axis.
Figure 11:
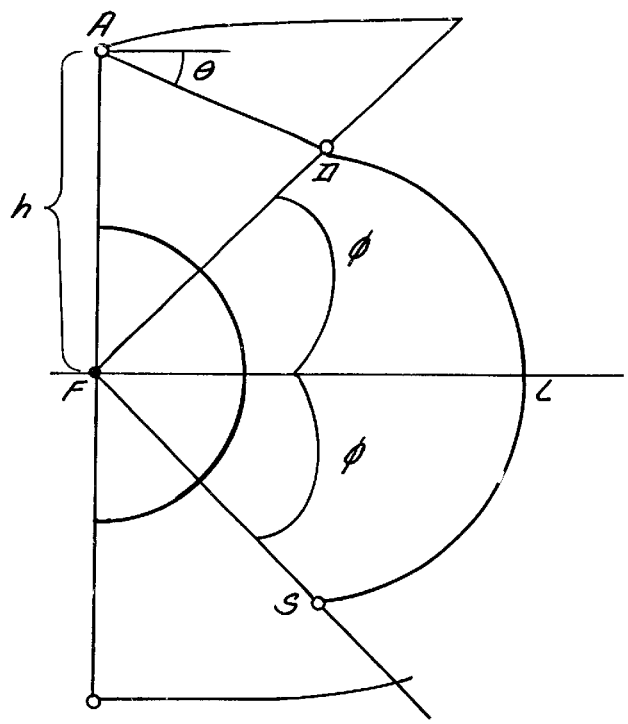
FIG. 11 is an exemplary illustration of the design of a NIBCC according to another embodiment.

The surface DLS is a convex ellipsoid. The back focus is at point F. It is known that if the eccentricity $\epsilon$ of the ellipsoid is $$\epsilon = 1/n \quad (1\text{-}10)$$

all rays will exit parallel to the x axis as illustrated in FIG. 10. If $r_1 = FA$ and $r_2 = AF_1$:

$$r_1 = a + \epsilon x \quad (1\text{-}11)$$

where a is the half axis of the ellipse. If the angle $\phi$ from FIG. 10 is equivalent to $\phi$ from FIG. 9, the situation is reflected in FIG. 11. The segment FD is $r_1$ for angle $\phi$. To find $r_1$, let's consider the triangle FAD:

$$r_1/\sin(90-\theta) = h/\sin(180-90+\theta-90+\phi), \quad (1\text{-}12)$$

or $$r_1/\cos \theta = h/\sin(\theta + \phi),$$

$$r_1 = h \cos \theta / \sin(\theta + \phi). \quad (1\text{-}13)$$

Because focal point F is at the position in which $x = -a\epsilon$ (FIG. 10), the x coordinate of point D is:

$$x_D = -a\epsilon + r_1 \cos \phi \quad (1\text{-}14)$$

However, from Eq. (1-11), we have:

$$r_1 = a + \epsilon x_D$$

or $$r_1 = a + \epsilon(-a\epsilon + r_1 \cos \phi). \quad (1\text{-}15)$$

Eq. (1-15) will determine the parameter a:

$$a = \frac{r_1}{(1-\epsilon^2)}(1-\epsilon\cos\phi) \quad (1\text{-}16)$$

Parameter a from Eq. (1-16) and parameter E from Eq. (1-10) will determine the ellipse. The design shown in FIG. 9 is theoretically free of aberrations. However, in practice, the light concentrated at point F has a finite size because it is the image of the end fibers over the GRIN lenses. This will lead to divergence of the outgoing beam.

Figure 12:
FIG. 12 is an exemplary illustration of the shape of a NIBCC for different magnitudes of index of refraction according to one embodiment.
Figure 12:
Figure 12:
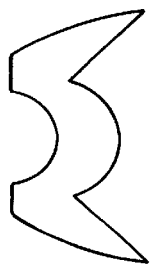
Figure 12:
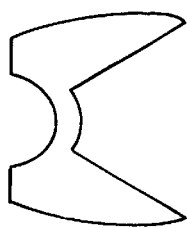

A NIE with an acceptable entrance angle of 180° exists for a very narrow interval of the refractive index of optical material. This interval of the refractive index is limited to index magnitudes from 1.7 to 1.85. Shape degradation of the NIE is caused by swelling of the elliptical part of the NIE with a decreasing index. This happens because the eccentricity grows with the decreasing index (Eq. (1-10)) and increases the absolute value of the small ellipse axis. This index decrease leads to an increase in the angle of total internal reflection k (FIG. 9), and hence, in the height of point D. If the index grows, the ellipse shrinks, which will once more lead to shape degradation. FIG. 12 is an exemplary illustration of the shape of the NIE for different magnitudes of index of refraction according to one embodiment.

Figure 13:
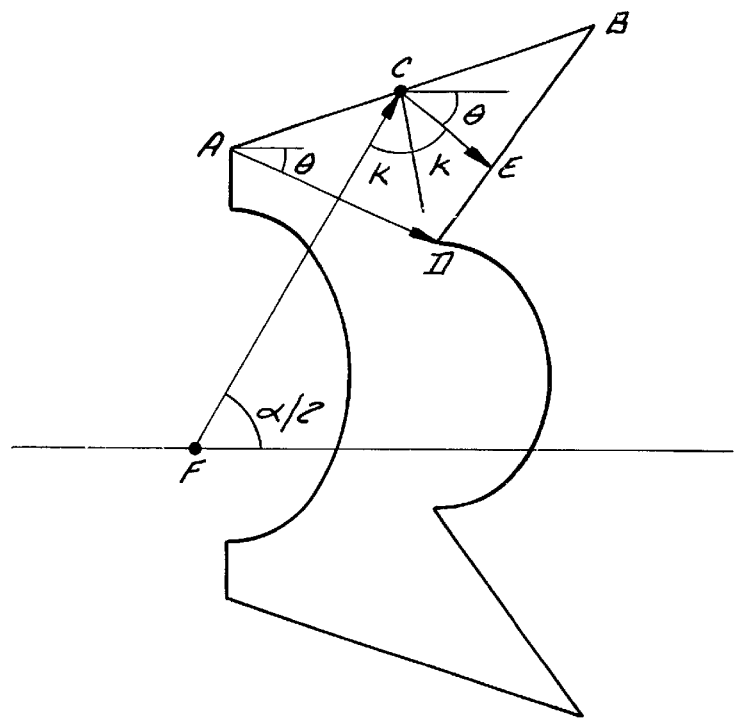
FIG. 13 is an exemplary illustration of a conjugation scheme for a reduced entrance angle according to one embodiment.

Diamond-turning is the only feasible technology for NIE manufacturing. However, using the diamond-turning process with glass creates a ruptured layer. A design can be created from optical plastic-acrylic. Acrylic has a refractive index of 1.5. The entrance angle of the NIE can be reduced from 180° to a lower value, such as 160°, to accommodate the refractive index. FIG. 13 is an exemplary illustration of a conjugation scheme for a reduced entrance angle according to one embodiment.

In FIG. 13, for the inclined parabola AB, the total internal reflection begins from point C. Despite the large magnitude of angle k, angle θ is sufficiently large to support the compact elliptical part of the NIBCC (ray AD is going down and point D is close to F). In this case, the ellipse does not swell. Where originally θ=90°−2K, now θ=90−2k+(90−α/2). The elliptical part is the main source of aberration in the NIBCC, even though it is sufficiently small in this design. Therefore, the fiber optic illumination assembly must be in accordance with the acceptance angle of the NIBCC.

Figure 14:
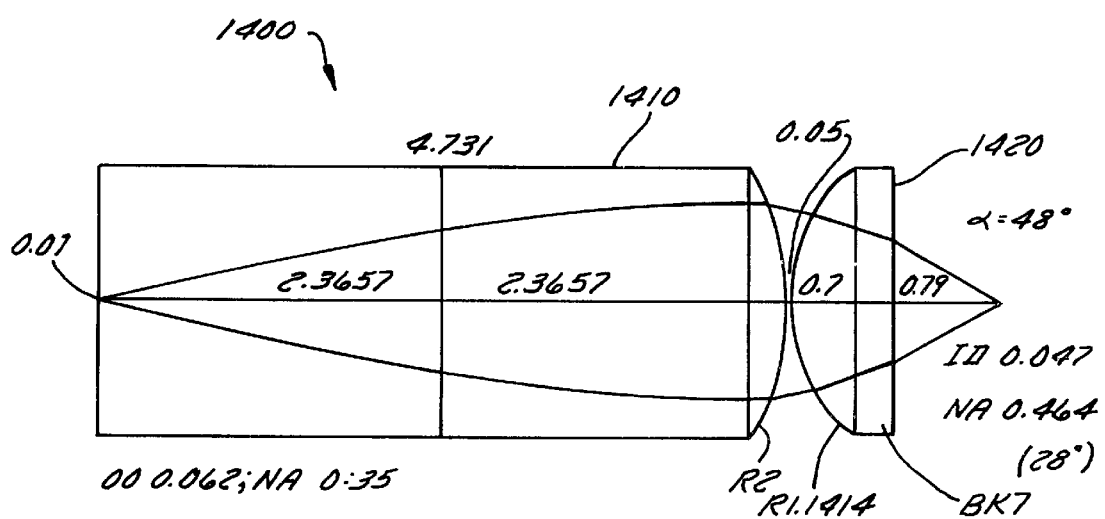
FIG. 14 is an exemplary illustration of focusing optics according to one embodiment.
Figure 15:
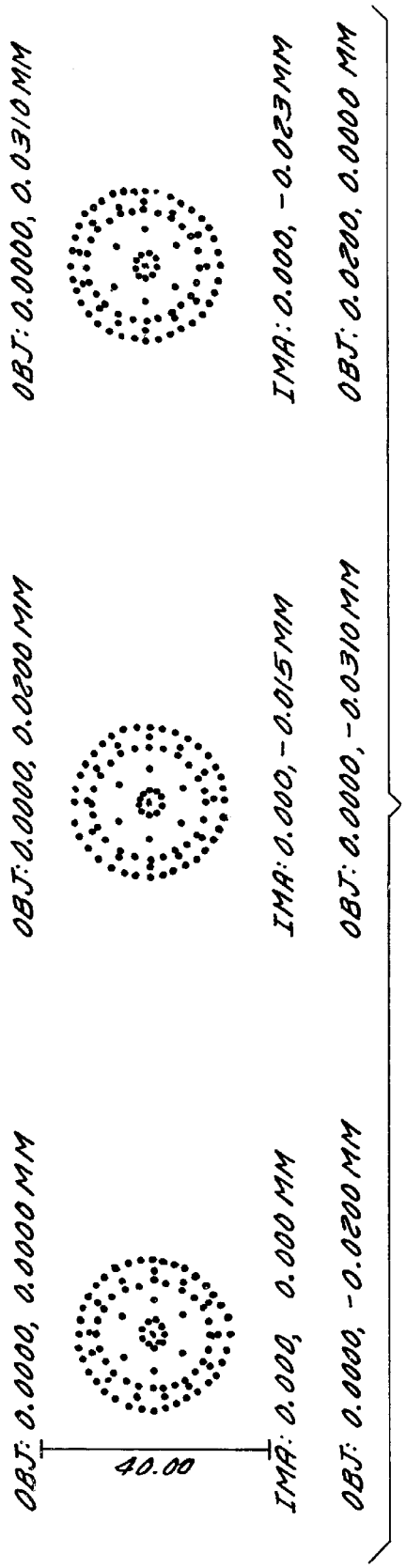
FIG. 15 is an exemplary illustration of how focusing optics provide good aberration correction.
Figure 16:
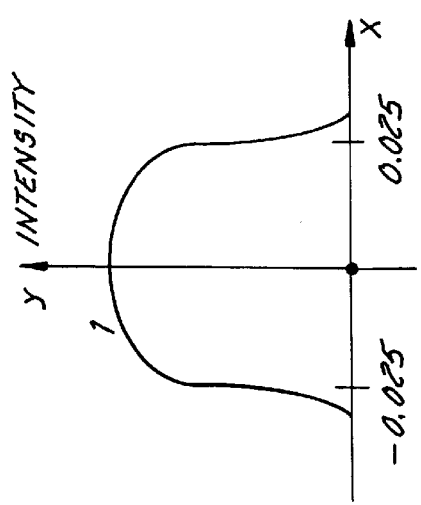
FIG. 16 is an exemplary illustration of an image of a fiber tip over a focusing system.

FIG. 14 is an exemplary illustration of focusing optics 1400 that utilizes a plano-convex GRIN lens 1410 and an additional positive component 1420 that can be used to achieve good quality of focusing optics according to one embodiment. The additional positive component 1420 compensates for aberrations and makes the input aperture equal to the fiber aperture, 0.35. The focusing optics 1400 provide good aberration correction as illustrated in FIG. 15. The three point spread function for object heights 0, 0.02 mm, and 0.031 mm are shown. The spot size is about 0.015 mm in diameter. This means that the image of the fiber tip over the focusing system will appear as shown in FIG. 16.

Figure 17:
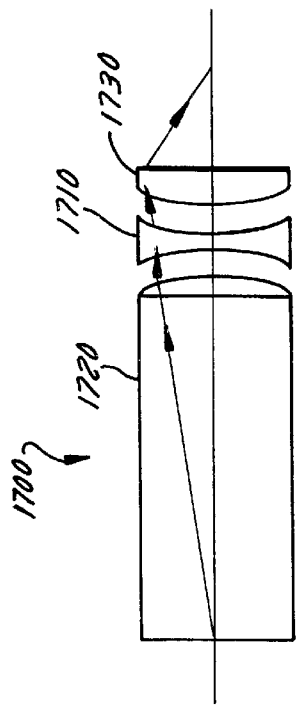
FIG. 17 is an exemplary illustration of focusing optics according to another embodiment.

FIG. 17 is an exemplary illustration of focusing optics 1700 according to another more sophisticated embodiment. The focusing optics 1700 can include a GRIN lens 1720, a positive component 1730, and a negative lens 1710. The negative lens 1710 can be used to project an exit pupil over the positive component 1730.

Figure 18:
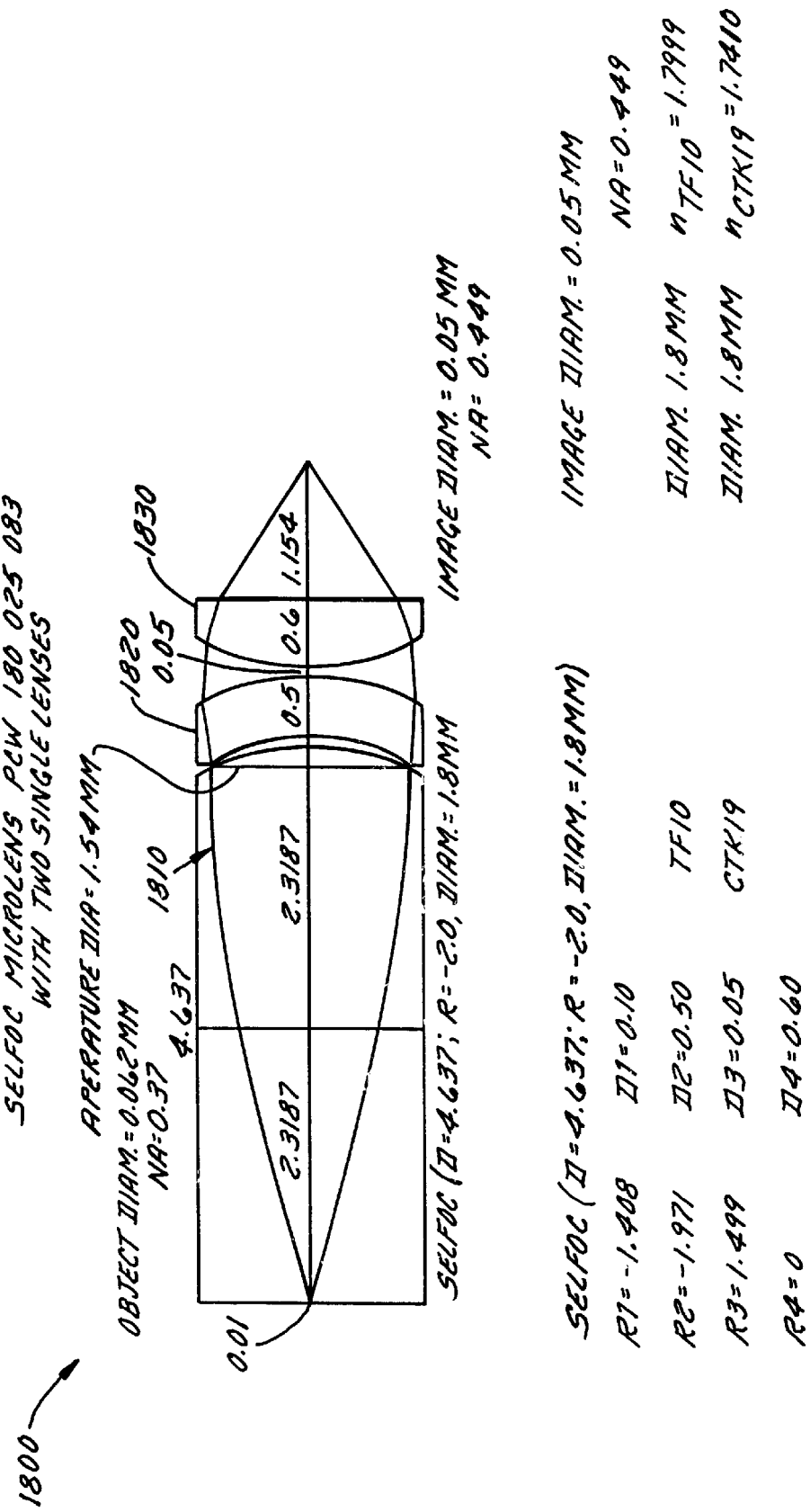
FIG. 18 is an exemplary illustration of focusing optics according to another embodiment.
Figure 19:
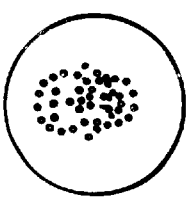
FIG. 19 is an exemplary illustration of point spread functions of focusing optics for four field-of-view points according to one embodiment.
Figure 19:
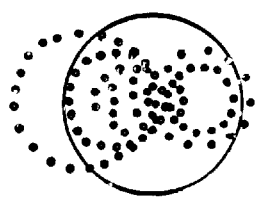
Figure 19:
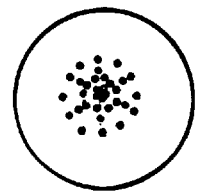
Figure 19:
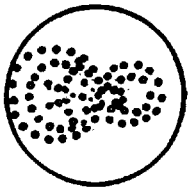

FIG. 18 is an exemplary illustration of focusing optics 1800 according to another embodiment. The focusing optics can include a GRIN lens 1810, a negative lens 1820 and a positive lens 1830. The image quality of focusing optics 1800 is 10 times better than for the objective in FIG. 14. The maximum spot size at the edge of the field-of-view is about 2 μm. FIG. 19 is an exemplary illustration of the point spread functions of focusing optics 1800 for four field-of-view points according to one embodiment.

Figure 20:
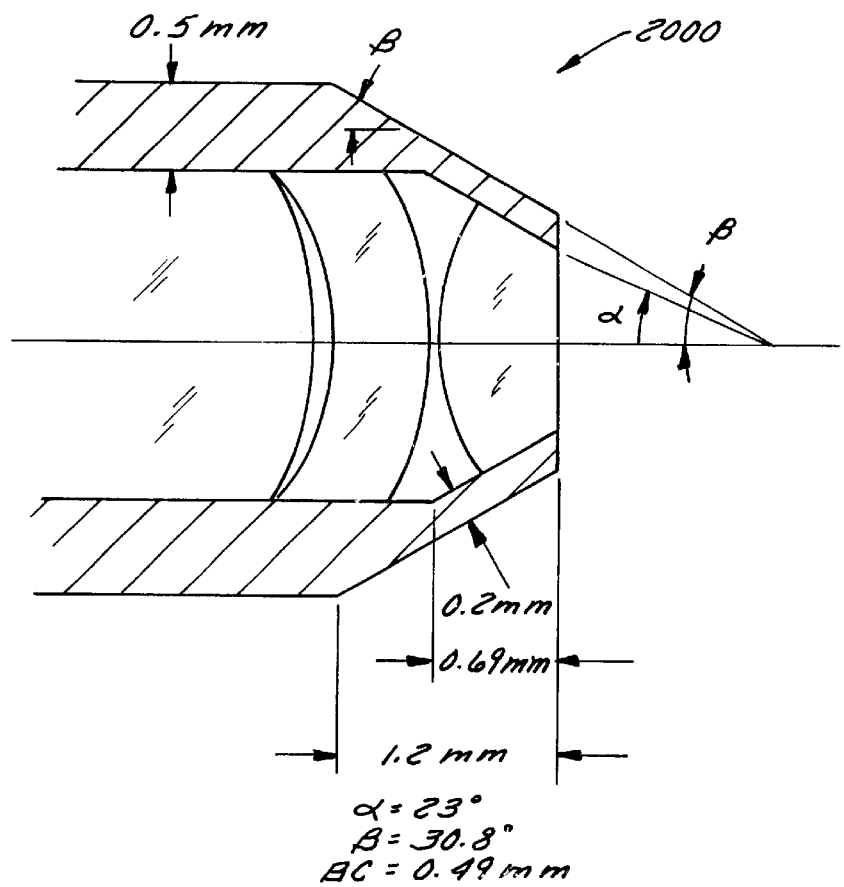
FIG. 20 is an exemplary illustration of housing design of a focusing objective according to one embodiment.

The exit aperture of the developed focusing objective is 0.449, or 26°. So the double angle of the light cone is 52°. The arrangement of seven focusing optics or objectives can cover the entrance cone of a NIBCC at about 156°. The optics of the objective can be assembled into a mechanical housing. The minimum thickness of the housing walls can be 0.2 mm. With an image distance of the 1.154 mm, shown in FIG. 18, the minimum half angle of beam interruption is about 9°. FIG. 20 is an exemplary illustration of housing design of a focusing objective 2000 according to one embodiment.

Figure 21:
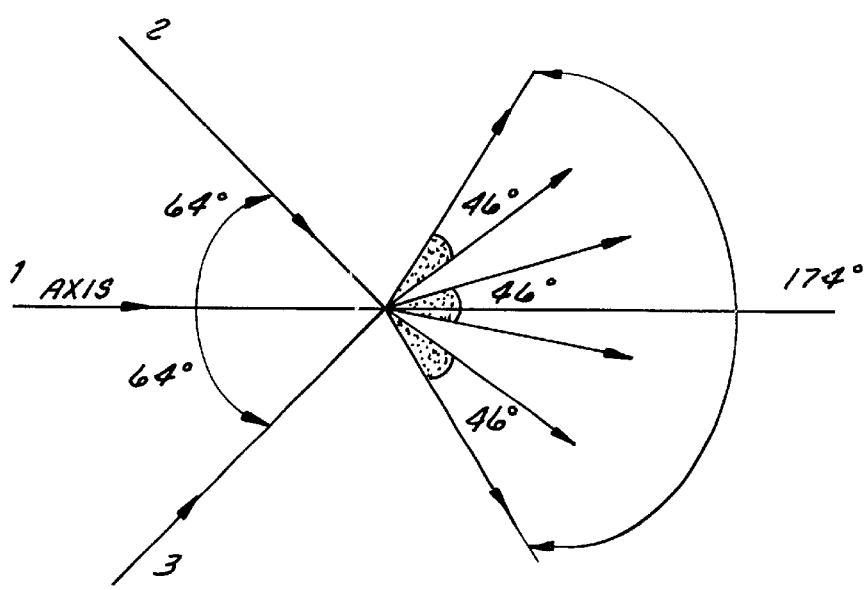
FIG. 21 is an exemplary illustration of an arrangement of beams incident on a NIBCC with the focusing objective according to one embodiment.

FIG. 21 is an exemplary illustration of an arrangement of beams incident on a NIBCC with the focusing objective 2000 according to one embodiment. The arrangement in FIG. 21 is close to optimal and can be achieved with existing micro-objective manufacturing technology.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Modifications and tactical transformations may be made. Additionally, various further changes may be made without departing from the spirit and scope of the invention.

What is claimed is:

1. An apparatus for combining and collimating light through an atmosphere comprising:
   at least two first light sources, the at least two first light sources emitting light of a same first wavelength substantially through a focus point; and
   a nonimaging element that receives the light of the same first wavelength after the focus point and collimates the light of the same first wavelength to sum a power of the light of the same first wavelength through the atmosphere,
   wherein the nonimaging element comprises:
      an input surface;
      a paraboloid surface located adjacent to the input surface;
      a conical surface located adjacent to the paraboloid surface; and
      an ellipsoid surface located adjacent to the conical surface and located on an opposite side of the nonimaging collimator element from the input surface.

2. The apparatus according to claim 1, wherein the at least two first light sources comprise at least one of fiber light sources, optical fibers, gradient index lens focusing systems, fiber lasers and laser diodes.

3. The apparatus according to claim 1, wherein the paraboloid surface comprises a total internal reflection surface.

4. The apparatus according to claim 1, further comprising at least two second light sources, the at least two second light sources emitting light of a same second wavelength through the focus point, wherein the nonimaging element further receives the light of the same second wavelength after the focus point and collimates the light of the same second wavelength to sum the power of the light of the same second wavelength through the atmosphere.

5. The apparatus according to claim 1, further comprising:
- a light source controller coupled to at least one of the at least two first light sources; and
- an atmospheric condition sensing device coupled to the light source controller.

6. The apparatus according to claim 5, wherein the light source controller controls light emitted by the at least one of the at least two first light sources based on atmospheric conditions sensed by the atmospheric condition sensing device.

7. The apparatus according to claim 6, wherein the light source controller causes the at least one of the at least two first light sources to stop emitting light when the atmospheric condition sensing device senses that the atmosphere transmits light easily.

8. The apparatus according to claim 6, wherein the light source controller causes the at least one of the at least two first light sources to emit light when the atmospheric condition sensing device senses that the atmosphere does not transmit light easily.

9. The apparatus according to claim 5, wherein the atmospheric condition sensing device comprises laser radar.

10. The apparatus according to claim 5, wherein the light source controller performs at least one of boosting, maintaining and lowering the power of light through the atmosphere based on atmospherics sensed by the atmospheric sensing device.

11. The apparatus according to claim 5, wherein the atmospheric condition sensing device senses atmospheric conditions within a beam of the light of the same first wavelength through the atmosphere.

12. An engraver comprising the apparatus of claim 1.

13. A target pointing system for targeting an object comprising the apparatus of claim 1.

14. The apparatus according to claim 1, wherein the input surface is a spherical input surface centered with the at least two first light sources.

15. An atmospheric optical network comprising:
- a first atmospheric optical data node including:
  - at least two first light sources, the at least two first light sources emitting light of a same first wavelength through a focus point,
  - at least two second light sources, the at least two second light sources emitting light of a same second wavelength through the focus point,
  - a nonimaging element that receives the light of the same first wavelength after the focus point and collimates the light of the same first wavelength to sum a power of the light of the same first wavelength through the atmosphere and receives the light of the same second wavelength after the focus point and collimates the light of the same second wavelength to sum the power of the light of the same second wavelength through the atmosphere; and
- a second atmospheric optical data node.

16. The network according to claim 15, further comprising a receiver that receives the light of the same first wavelength and the light of the same second wavelength from the atmosphere.

17. The network according to claim 16, wherein the receiver is located approximately 10 kilometers from the apparatus for combining and collimating light.

18. The network according to claim 16, wherein the receiver includes a wavelength division demultiplexer that demultiplexes the light of the same first wavelength from the light of the same second wavelength.

19. The network according to claim 16, wherein the receiver includes an add/drop multiplexer.

20. The network according to claim 15, further comprising a reflector that reflects the collimated light through the atmosphere.

21. The network according to claim 15, further comprising a refractor that refracts the collimated light to a first receiver and a second receiver.

22. The network according to claim 15, further comprising:
- a light source controller coupled to at least one of the at least two first light sources; and
- an atmospheric condition sensing device coupled to the light source controller.

23. The network according to claim 22, wherein the light source controller controls light emitted by the at least one of the at least two first light sources based on atmospheric conditions sensed by the atmospheric condition sensing device.

24. The network according to claim 23, wherein the light source controller causes the at least one of the at least two first light sources to stop emitting light when the atmospheric condition sensing device senses that the atmosphere transmits light easily.

25. The network according to claim 23, wherein the light source controller causes the at least one of the at least two first light sources to emit light when the atmospheric condition sensing device senses that the atmosphere does not transmit light easily.

26. The network according to claim 22, wherein the atmospheric condition sensing device comprises laser radar.

27. The network according to claim 22, wherein the light source controller performs at least one of boosting, maintaining and lowering the power of light through the atmosphere based on atmospherics sensed by the atmospheric sensing device.

28. The network according to claim 22, wherein the atmospheric condition sensing device senses atmospheric conditions within a beam of the light of the same first wavelength through the atmosphere.

29. An atmospheric optical data node comprising:
- at least two first light sources, the at least two first light sources emitting light of a same first wavelength through a focus point;
- at least two second light sources, the at least two second light sources emitting light of a same second wavelength through the focus point; and
- a nonimaging element that receives the light of the same first wavelength after the focus point and collimates the light of the same first wavelength to sum a power of the light of the same first wavelength through the atmosphere and receives the light of the same second wavelength after the focus point and collimates the light of the same second wavelength to sum the power of the light of the same second wavelength through the atmosphere.

* * * * *

UNITED STATES PATENT AND TRADEMARK OFFICE
CERTIFICATE OF CORRECTION

PATENT NO.    : 6,369,925 B1
DATED         : April 9, 2002
INVENTOR(S)   : Il'ya Agurok and Lonnie Lindsey It is certified that error appears in the above-identified patent and that said Letters Patent is hereby corrected as shown below:

Column 1,
Line 2, -- ORIGIN OF INVENTION

The invention described herein was made with Government support under Contract DAAD17-00-C-0085 awarded by the U.S. Army in which the government has certain rights in the invention. --

Signed and Sealed this

Twenty-first Day of September, 2004

JON W. DUDAS
*Director of the United States Patent and Trademark Office*